UNITED STATES PATENT OFFICE.

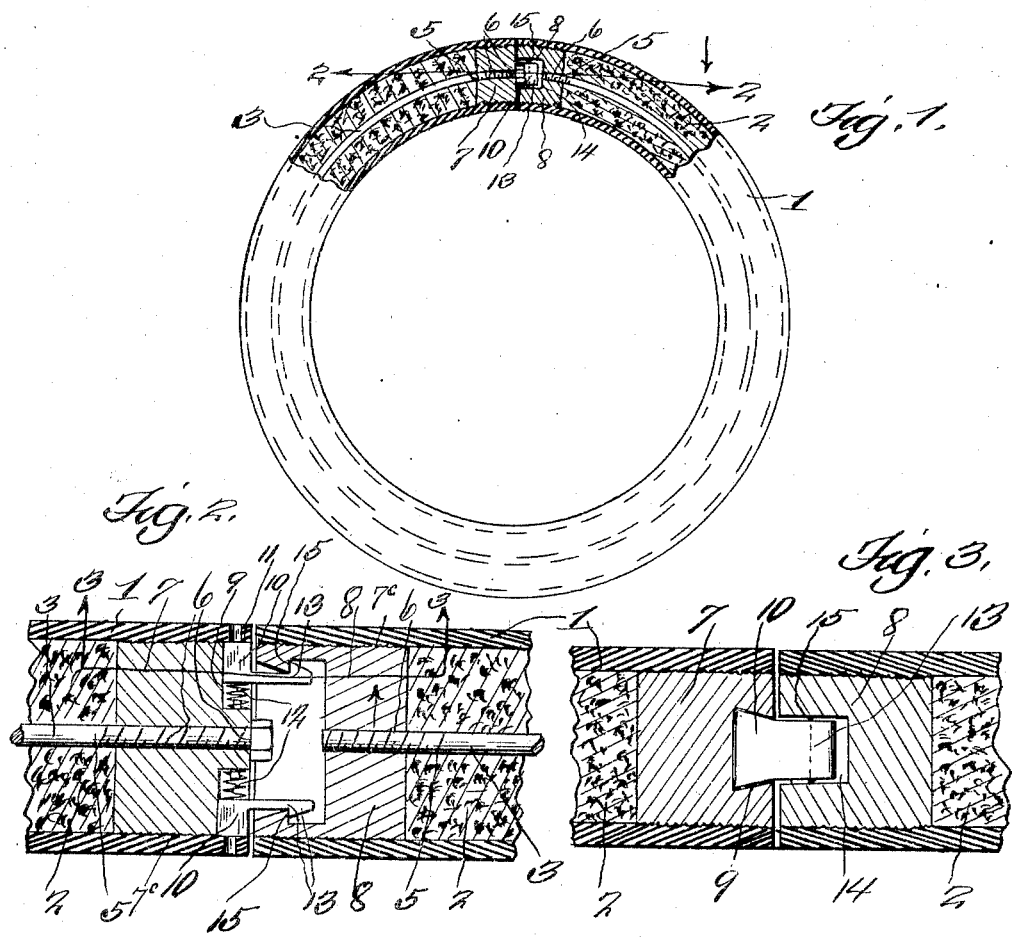

LUTHER M. TICHENOR, OF OWENSVILLE, INDIANA.

EMERGENCY AUTOMOBILE-TIRE.

1,076,719.

Specification of Letters Patent.  Patented Oct. 28, 1913.

Application filed March 18, 1913.  Serial No. 754,086.

*To all whom it may concern:*

Be it known that I, LUTHER M. TICHENOR, a citizen of the United States, residing at Owensville, in the county of Gibson and State of Indiana, have invented a new and useful Emergency Automobile-Tire; and I do hereby declare the following to be a full, clear, and exact description of the invention, such as will enable others skilled in the art to which it appertains to make and use the same.

This invention relates to the art of automobiles, and particularly to a new and useful emergency automobile tire.

When an automobile tire becomes punctured, while on an automobile tour, or a blow-out or other tire trouble occurs, and there is no way of repairing the tire without considerable loss of time and trouble on the part of the chauffeur, it is the object of the present invention to provide what is known as an "emergency tire," one that can be easily and readily adjusted to the wheel in a very short time, thus answering the purpose, until the machine can be run to the garage, where the tire can be mended.

Another object of the invention is the provision of an emergency tire comprising a hollow tube constructed of composition rubber and canvas, suitably packed with small particles of cork or the like and provided with an interior centrally arranged circular rod, which together with the filler of cork or the like tends to hold the emergency tire in its proper shape.

Another object of the invention is the provision of two circular plates, one secured to each end of the circular rod. The plates are provided with locking devices, whereby the tire may be held upon the rim of the wheel.

In practical fields the details of construction of the improved emergency tire may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a sectional view, partly in elevation of the improved emergency tire constructed in accordance with the invention. Fig. 2 is a sectional view on line 2—2 of Fig. 1. Fig. 3 is a sectional view on line 3—3 of Fig. 2. Fig. 4 is an end view of one end of the tire.

Referring more particularly to the drawings, 1 designates a tubular emergency tire constructed of a composition of rubber and canvas, in which a filler of cork, or other fibrous material 2, tending to hold the tire in its proper shape, is arranged. A circular rod 3 extends centrally through the tire, the ends 5 of which are secured as shown at 6 to the circular plates 7 and 8. The plates 7 and 8 are provided with threads 7°, which engage the inner circumference of the tire 1 to prevent displacement. The circular plate 7, in Figs. 1 to 4 inclusive is provided with dove-tailed recesses 9, which open upon the opposite sides of the tire. Even though the plates 7 and 8 are threaded, they are vulcanized in the tire at the threaded portions, in any suitable manner. Mounted in the recesses 9 are correspondingly shaped blocks or members 10, which are retained in position and against the wall of the tubular tire, as shown in Fig. 2, as at 11, by means of the springs 12.

Carried by the members 10 are the spring catch lugs 13, which enter the recess 14 of the circular plate 8, that is, when the two ends of the tire are brought together, so as to engage the shoulders 15 of the circular plate 8. When the two ends of the tire are brought together, spring catch lugs first engage the inclined surfaces 16, thereby moving the lug inwardly, so as to allow them to engage the shoulders. The recess 14, as shown clearly in Figs. 1 and 3, is only wide enough to admit the spring catch lugs. In this manner lateral movement of the opposite ends of the tire, is prevented.

The tubular tire is vulcanized or otherwise secured to the threaded portions of the circular plates 7 and 8.

The invention having been set forth, what is claimed as new and useful is:—

A split emergency tire provided with a filler and including a circular rod extending centrally therethrough, plates having threaded portions vulcanized to the interior of the opposing ends of the tire and provided with threaded connections to the opposing ends of said rod, one of said plates having a recess provided with oppositely arranged shoulders, the other plate being provided with oppositely arranged dove-tailed recesses opening upon the sides of the tire, spring retained members mounted in said dove-tailed recesses and provided with integral spring catch lugs to engage the shoulders of the opposite plates, said casing of the tire having openings registered with the dove-tailed recesses to receive an instrument whereby said members may be actuated against the tension of their springs to disconnect the spring catch lugs, the tire adjacent the ends of the dove-tailed recesses holding the spring retained members in the dove-tailed recesses.

In testimony whereof I have signed my name to this specification in the presence of two subscribing witnesses.

LUTHER M. TICHENOR.

Witnesses:
HENRY MAUCK,
JNO. C. KENDLE.